United States Patent
Todd (10) Patent No.: US 11,970,958 B1
(45) Date of Patent: Apr. 30, 2024

(54) CHAIN OR BELT DRIVE WITH MULTIPLE NON-PREVALENT ORDER SPROCKETS OR PULLEYS

(71) Applicant: BorgWarner, Inc., Auburn Hills, MI (US)

(72) Inventor: Kevin B Todd, Freeville, NY (US)

(73) Assignee: BORGWARNER INC., Auburn Hills, MI (US)

(*) Notice: Subject to any disclaimer, the term of this patent is extended or adjusted under 35 U.S.C. 154(b) by 95 days.

(21) Appl. No.: 18/064,779

(22) Filed: Dec. 12, 2022

(51) Int. Cl.
| | |
|---|---|
| F01L 1/46 | (2006.01) |
| F01L 1/02 | (2006.01) |
| F01L 1/053 | (2006.01) |
| F16H 7/02 | (2006.01) |
| F16H 7/06 | (2006.01) |
| F16H 57/00 | (2012.01) |

(52) U.S. Cl.
CPC ............... F01L 1/46 (2013.01); F01L 1/022 (2013.01); F01L 1/024 (2013.01); F01L 1/053 (2013.01); F16H 7/02 (2013.01); F16H 7/06 (2013.01); F16H 57/0006 (2013.01); F01L 2001/0535 (2013.01); F01L 2250/02 (2013.01); F01L 2250/04 (2013.01)

(58) Field of Classification Search
CPC ... F01L 1/46; F01L 1/022; F01L 1/024; F01L 1/053; F01L 2001/0535; F01L 2250/02; F01L 2250/04; F16H 7/02; F16H 7/06; F16H 55/30; F16H 57/0006; F16H 2035/003; F02B 67/06; B62M 9/08; B62M 2009/002

USPC ................ 123/90.31; 474/156, 152
See application file for complete search history.

(56) References Cited

U.S. PATENT DOCUMENTS

| | | | |
|---|---|---|---|
| 6,213,905 B1 | 4/2001 | White et al. | |
| 7,125,356 B2 | 10/2006 | Todd | |
| 8,066,602 B2 | 11/2011 | Todd | |
| 8,430,775 B2 | 4/2013 | Todd et al. | |
| 10,907,721 B2* | 2/2021 | Todd | F16H 55/30 |
| 2003/0087714 A1* | 5/2003 | Todd | F16H 55/30 |
| | | | 474/202 |
| 2003/0104886 A1* | 6/2003 | Gajewski | F02B 67/06 |
| | | | 474/87 |
| 2006/0154766 A1* | 7/2006 | Lacy | F02B 67/06 |
| | | | 474/166 |
| 2010/0137085 A1* | 6/2010 | Nakano | F01L 1/02 |
| | | | 474/155 |
| 2010/0167857 A1* | 7/2010 | Todd | F16H 55/30 |
| | | | 474/155 |

* cited by examiner

Primary Examiner — Kenneth J Hansen
Assistant Examiner — Kelsey L Stanek
(74) Attorney, Agent, or Firm — Brown & Michaels, PC (57) ABSTRACT

Reducing engagement noise in a chain drive or belt drive for an internal combustion engine having a crankshaft having a driving sprocket and at least one shaft having a first driven sprocket and a second driven sprocket, where the driving sprocket and at least one of the first driven sprocket and the second driven sprocket contain a pattern of pitch radii such that the radial variation of the pitch radii excite tensions at non-prevalent orders in a drive system of the internal combustion engine. The non-prevalent engine cycle orders excited by each of the driving sprocket, the first driven sprocket and the second driven sprocket are different.

20 Claims, 6 Drawing Sheets

CHAIN OR BELT DRIVE WITH MULTIPLE NON-PREVALENT ORDER SPROCKETS OR PULLEYS

BACKGROUND

The present invention relates to the field of sprockets or pulleys, and more specifically to sprockets of a chain system or pulleys of a belt drive, having random patterns created with unique non-prevalent engine cycle order(s) assigned to two or more sprockets or pulleys, such that no two sprockets or pulleys within a chain or belt system excite the same drive resonance or strand vibration at the same engine speed.

Figure 1:
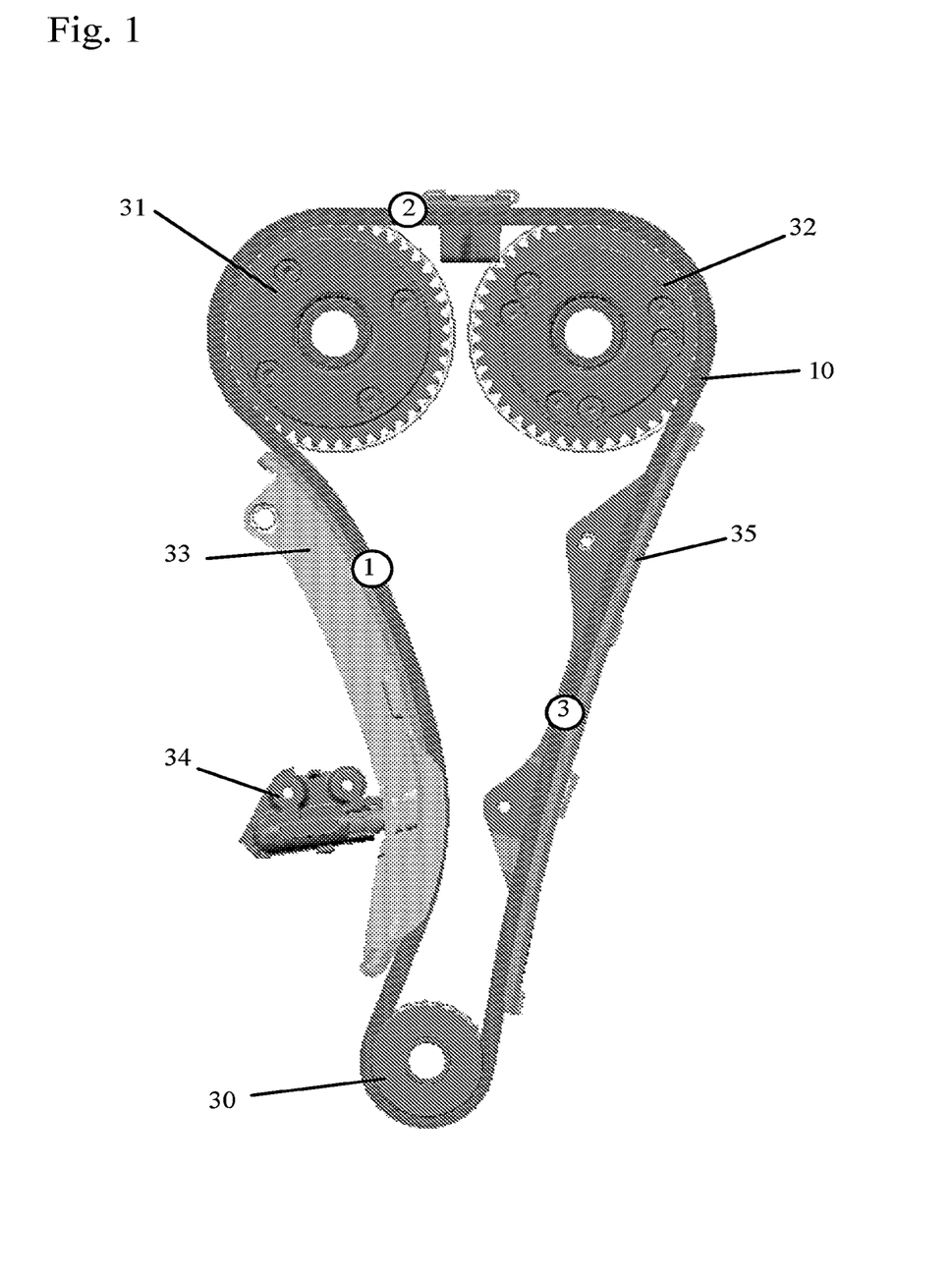
FIG. 1 shows a typical dual overhead cam drive.

FIG. 1 shows an example of a chain drive system for a typical engine—for example, this arrangement might be used in a dual overhead cam (DOHC) chain drive. There are three sprockets—sprocket 30 (driving sprocket) is on the crankshaft, sprocket 31 (camshaft sprocket 1) is the exhaust camshaft sprocket and sprocket 32 (camshaft sprocket 2) is the intake camshaft sprocket. A chain 10 is made up of strands 1-3, is driven by the crankshaft sprocket 30. A tensioner arm 33 is biased towards and provides tension on strand 1 by a tensioner 34. The tensioner arm 33 is located between the exhaust camshaft sprocket 31 (camshaft sprocket 1) and the crankshaft sprocket 30 and a guide 35 provides chain motion control on strand 3 between the intake camshaft sprocket 32 (camshaft sprocket 2) and the crank sprocket 30.

A chain or toothed belt drive 10 is subjected to oscillating excitations. For example, a chain or toothed belt drive 10 can be used between an engine crankshaft and camshaft. The oscillating excitations could be torsional vibrations of the crankshaft and/or fluctuating torque loads from the valve train and/or fuel pump.

Furthermore, it is well known that chain to sprocket engagement forces are high on sprockets with fewer teeth. As a result, small sprockets generate more pitch (chain engagement) frequency noise. It is less well known that pitch frequency noise generation also depends on the stiffness of the chain strand engaging the sprocket. Strand stiffness depends on the chain stiffness and strand length. Short strands are much stiffer than long strands. High pitch frequency noise can be generated by larger sprockets if they are connected to short chain strands.

When pitch frequency noise is a problem, a random sprocket can be applied. Typically, just the smallest sprocket is randomized. Traditional random sprockets use a fixed "random" pattern of pitch radius variation to vary the timing of engagement. This breaks up the engagement noise so it is not an objectionable pure tone. With a nonrandom sprocket, engagement noise is all concentrated at engagement frequency or engagement order. With a random sprocket the engagement noise is spread out over many orders—predominantly at low orders and orders around engagement order. While the random sprocket reduces objectionable noise, the radial variation of the random sprocket creates oscillating tensions in the chain drive—mostly at low orders (several times per sprocket revolution).

Other factors also determine how much pitch frequency noise is generated and how loud it is at the listener's location. What the listener hears depends on the noise path. If the noise path includes structural resonances that amplify the pitch frequency, the listener will hear higher pitch frequency noise. A common example of this for an engine cam drive is a structural resonance in the engine front cover. Structural resonance can amplify pitch noise from the closest sprocket, regardless of the sprocket size.

Most chain drives have one or more torsional resonance frequencies. If the tension fluctuations caused by the random sprocket are at an order that has a frequency at, or near, a chain drive torsional resonance frequency, the tension fluctuations will be amplified—possibly causing substantial variation in the chain tensions.

If the chain drive has no external causes of tension variation (such as crank TVs, cam torque, fuel pump torque), the oscillating tensions caused by the random sprocket will add to the mean tension to increase the overall maximum tension. In this case a random sprocket will always increase maximum chain tensions. If the maximum tension remains within the acceptable range for the chain, this may not be a problem.

If the chain drive has external causes of tension variation, it is likely that the random sprocket will create tension variations at orders where tension variations already exist from the external sources. In many cases this will create tensions that will add and increase the overall maximum tensions. Using existing random sprocket methods almost always results in an increase in the overall maximum chain tension. In many cases the tension is increased beyond the acceptable tension level for the chain. For this reason, it is not possible to use traditional random sprockets on many chain drives with external sources of tension variation such as engine cam or balance shaft drives.

Tension reducing random sprockets were developed by defining the random sprocket radial variation pattern to create tensions at one or two specific orders. The tensions created by the tension reducing random sprocket are phased to be opposite tensions caused by external sources of tension variation. This results in a cancellation of tensions and a reduction in overall maximum tension levels. Because tension reducing random sprockets use uniform repeating patterns, amplitudes must be selected to generate the correct tension levels. Tension reducing random sprockets often do not have much effect on engagement noise.

A tension reducing sprocket uses orders prominent in the chain tensions to create tension fluctuations that are phased opposite the tensions caused by the oscillating excitations so that the tensions at those orders cancel or partially cancel at the chain or belt drive resonance (when the overall maximum tensions are dominated by one of these orders)

The problem is how to design a random sprocket for sufficient noise reduction while limiting the increase in overall chain tensions. Non-prevalent order (NPO) sprockets were developed to address the problem.

SUMMARY

In an embodiment of the present invention, a non-prominent (NPO) random sprocket or pulley with varying pitch radii that reduce the engagement noise of the drive is disclosed. The NPO random sprocket or pulley uses a radial variation pattern made of orders that are not already prominent in the chain tension, which are caused by the oscillating excitations.

The chain or toothed belt drive with oscillating excitations and torsional resonance creates oscillating tensions at specific orders. These orders should be avoided in the NPO random sprocket radial variation pattern to minimize the increase in chain tension caused by the random pattern.

Multiple NPO sprockets are applied in a chain system to solve the problem of high pitch frequency noise coming from more than just the smallest sprocket, for reasons explained above. Unique order multiple NPO sprockets are applied so that no two sprockets excite the same drive resonance at the same speed and so that installed NPO sprocket orientation cannot adversely affect the system.

Using multiple NPO random sprockets with radial variation made up of orders not prominent in the chain tension reduces tensions caused by the NPO random sprocket exciting the drive resonance at the same time as tensions caused by the oscillating excitations, improving the pitch noise reduction while minimizing the increase in chain tension caused by the NPO random sprocket.

Each NPO random sprocket of an embodiment of the present invention within a chain system has different orders not prominent in the chain tension than another sprocket. Therefore, no two NPO sprockets within the chain system have the same orders or overlapping orders of orders not prominent in the oscillating tensions of the chain or toothed belt drive.

DETAILED DESCRIPTION

It is noted that embodiments of the present invention address the problem of increasing chain tensions by creating the random pattern using only orders that are not prevalent in the chain tensions. By doing this the interaction between tensions caused by the random sprocket and tensions caused by external sources is minimized. Each of the NPO sprockets includes different orders that are not prevalent in the chain tensions. In addition, the tensions caused by the random sprocket will not excite resonances at the same time as tensions caused by external sources. Furthermore, the orientation of the radial variation on the random sprocket is no longer important, since the orientation of the radial variation on the sprocket does not add or cancel orders caused by external sources or other sprockets. Additionally, using multiple NPO sprockets each with different non-prevalent orders increases the pitch order reduction and does not increase the maximum tension change.

Embodiments of the invention can be applied to engine timing drives (e.g. cam drive, balance shaft drives, fuel pump drives and oil pump drives) and any drive that has repetitive dynamic loads.

It is possible to combine this method with a tension reducing random sprocket. This can be done by first defining the orders, amplitudes and phasing for a tension reducing sprocket. Then other orders not already prominent in the chain tension can be added to further improve engagement noise reduction with minimal increase in overall maximum tensions.

The chain or toothed belt drive could have many configurations and a variety of oscillating excitations. What is important is that the drive is subject to oscillating excitations and the drive has a torsional resonance that can be excited by these excitations. There are many possible radial variation patterns that could be used. What is important is that the pattern does not contain orders that are prominent in the chain tensions. Furthermore, multiple NPO sprockets are present within the same drive each with a different pattern such that all of the multiple NPO sprockets do not contain orders that are prominent in the chain tensions. The multiple NPO sprockets all contain different non-prevalent orders, such that there is no overlap. The orientation of the NPO sprockets relative to each other is irrelevant. The number of NPO sprockets is between two and the number of sprockets/pulleys in the drive.

The Table 1 below shows using a single non-prevalent order (NPO) random sprocket in combination with round sprockets as in the prior art or multiple NPO random sprockets in an embodiment of the present invention. As seen below, in both simulation and testing, the pitch order reduction is higher using multiple NPO random sprockets.

TABLE 1

|  |  | Crank Sprocket | Cam Sprocket 1 | Cam Sprocket 2 | Pitch Order Reduction (%) | Pitch Order Reduction (dBA) |
|---|---|---|---|---|---|---|
| Engine Chain Drive Structure | 1 | NPO Random sprocket | Round sprocket | Round Sprocket | 25.8 | 4.85 |
|  | 2 | NPO Random sprocket | NPO Random sprocket | NPO Random sprocket | 50.8 | 8.17 |

A single engine cycle has oscillating excitations at different speeds. Each four-stroke engine cycle includes two crank revolutions. For example, in a four-cylinder engine, the oscillating excitations have a pattern that repeats four times in the engine cycle. This creates a dominant, prevalent fourth engine cycle order (the excitations increase and decrease four times per engine cycle). Multiples of the fourth order engine cycle orders (8, 12, 16 . . . ) can also be present.

Table 2 below shows examples of non-prevalent engine cycle orders that may be incorporated into the radial variation pattern on a sprocket based on typical valvetrain torques.

TABLE 2

Examples of Valvetrain Torque Engine Cycle Orders

| Engine Type | Non-Prevalent Engine Cycle Orders | Prevalent Engine Cycle Orders |
|---|---|---|
| 2 Cylinder Engine | 1, 3, 5, 7, 9 . . . | 2, 4, 6, 8, 10 . . . |
| 3 Cylinder Engine | 1, 2, 4, 5, 7, 8, 10, 11, 13, 14, 16, 17, 19, 20, 21 . . . | 3, 6, 9, 12, 15, 18 . . . |

TABLE 2-continued

Examples of Valvetrain Torque Engine Cycle Orders

| Engine Type | Non-Prevalent Engine Cycle Orders | Prevalent Engine Cycle Orders |
|---|---|---|
| Inline 4 Cylinder Engine | 1, 2, 3, 5, 6, 7, 9 . . . | 4, 8, 12, 16 . . . |
| Inline 5 Cylinder Engine | 1, 2, 3, 4, 6, 7, 8, 9, 11 . . . | 5, 10, 15 . . . |
| Inline 6 Cylinder Engine | 1, 2, 3, 4, 5, 7, 8, 9, 10, 11, 13 . . . | 6, 12, 18 . . . |
| V6 Single Bank | 1, 2, 4, 5, 7, 8 . . . | 3, 6, 9, 12 . . . |
| V6 Serpentine | 1, 2, 3, 4, 5, 7, 8, 9, 10, 11, 13 . . . | 6, 12, 18 . . . |
| Standard-firing V8 Single Bank | 2, 4, 6, 10, 12, 14, 15 . . . | 1, 3, 5, 7, 8, 9, 11, 13 . . . |
| V8 Serpentine | 1, 2, 3, 4, 5, 6, 7, 9, 10, 11, 12, 13, 14, 15, 17 . . . | 8, 16 . . . |
| Alternating banks V8 Single bank | 1, 2, 3, 5, 6, 7, 9 . . . | 4, 8, 12 . . . |

In one example, prevalent orders on many 3-cylinder engines are $3^{rd}$, $6^{th}$, $9^{th}$, $12^{th}$, $15^{th}$, and $18^{th}$ engine cycle orders. This leaves non-prevalent orders of $1^{st}$, $2^{nd}$, $4^{th}$, $5^{th}$, $7^{th}$, $8^{th}$, $10^{th}$, $11^{th}$, $13^{th}$, 14, 16, $17^{th}$, $19^{th}$, $20^{th}$, $21^{st}$. For a dual overhead cam (DOHC) drive with one crank shaft sprocket and two cam sprockets, for example as shown in FIG. 1, the crank sprocket would have a radial variation pattern indicative of an $8^{th}$, $10^{th}$ and $20^{th}$ engine cycle orders, the first cam sprocket would have a radial variation pattern indicative of a $5^{th}$, $17^{th}$ and $21^{st}$ engine cycle order and the second cam sprocket would have a radial variation pattern indicative of a $7^{th}$, $11^{th}$ and $14^{th}$ engine cycle orders. By using unique orders for each of the NPO sprockets in the system, no two sprockets can simultaneously excite the same vibrations (chain drive resonance or chain strand vibrations), minimizing the unwanted effects on chain tension.

Crank torsional vibrations (TVs) are another excitation, in addition to cam torques, to the system that also cause chain tension at specific orders. The orders and resulting tension amplitudes from crank TVs are less consistent than cam torque, such that the actual orders that create prevalent orders can vary application to application. The introduction of the non-prevalent engine cycle orders based on the crankshaft torsional vibrations can be added for specific applications where the crankshaft is adding to the chain tension. Table 3 shows examples of crankshaft TVs engine cycle orders.

TABLE 3

Examples of Crankshaft Torsional Vibrations Engine Cycle Orders

| Engine Type | Non-Prevalent Engine Cycle Orders | Prevalent Engine Cycle Orders |
|---|---|---|
| 2 Cylinder Engine | 1, 3, 5, 7, 9 . . . | 2, 4, 6, 8, 10 |
| Inline 3 Cylinder Engine | 1, 2, 4, 5, 7, 8, 10, 11, 13, 14, 16, 17, 19, 20, 21 . . . | 3, 6, 9, 12, 15, 18 |
| Inline 4 Cylinder Engine | 2, 6, 10, 11, 13, 14, 15, 17, 18, 19, 21 . . . | 1, 3, 4, 5, 7, 8, 9, 12, 16, 20 |
| Inline 5 Cylinder Engine | 1, 2, 3, 7, 8, 11, 12, 13, 14, 16, 17, 18, 19, 21 . . . | 4, 5, 6, 9, 10, 15, 20 |
| V6 Engine | 1, 2, 3, 8, 9, 10, 11, 13, 14, 15, 16, 17, 19, 20 . . . | 4, 5, 6, 7, 12, 18 |
| Standard-firing V8 Single Bank | 2, 4, 7, 9, 10, 11, 12, 13, 14, 15, 17, 18, 20 | 1, 3, 5, 6, 8, 16 |

When selecting orders to use for NPO sprockets in an embodiment of the present invention, the prevalent orders are the combination of prevalent orders from all the excitations. For example, if a chain system drives the camshaft(s) and a fuel pump, the non-prevalent orders available for NPO sprockets would be non-prevalent orders that exist in the cam torques (Table 2) and crank TVs (Table 3) and the fuel pump torque. In some cases, the chain tension from the original round sprocket system can be used to determine the prevalent orders (any order significant chain tension amplitude), which is a result of excitations from any of cam torques, fuel pump torques, and crank TVs.

Figure 4:
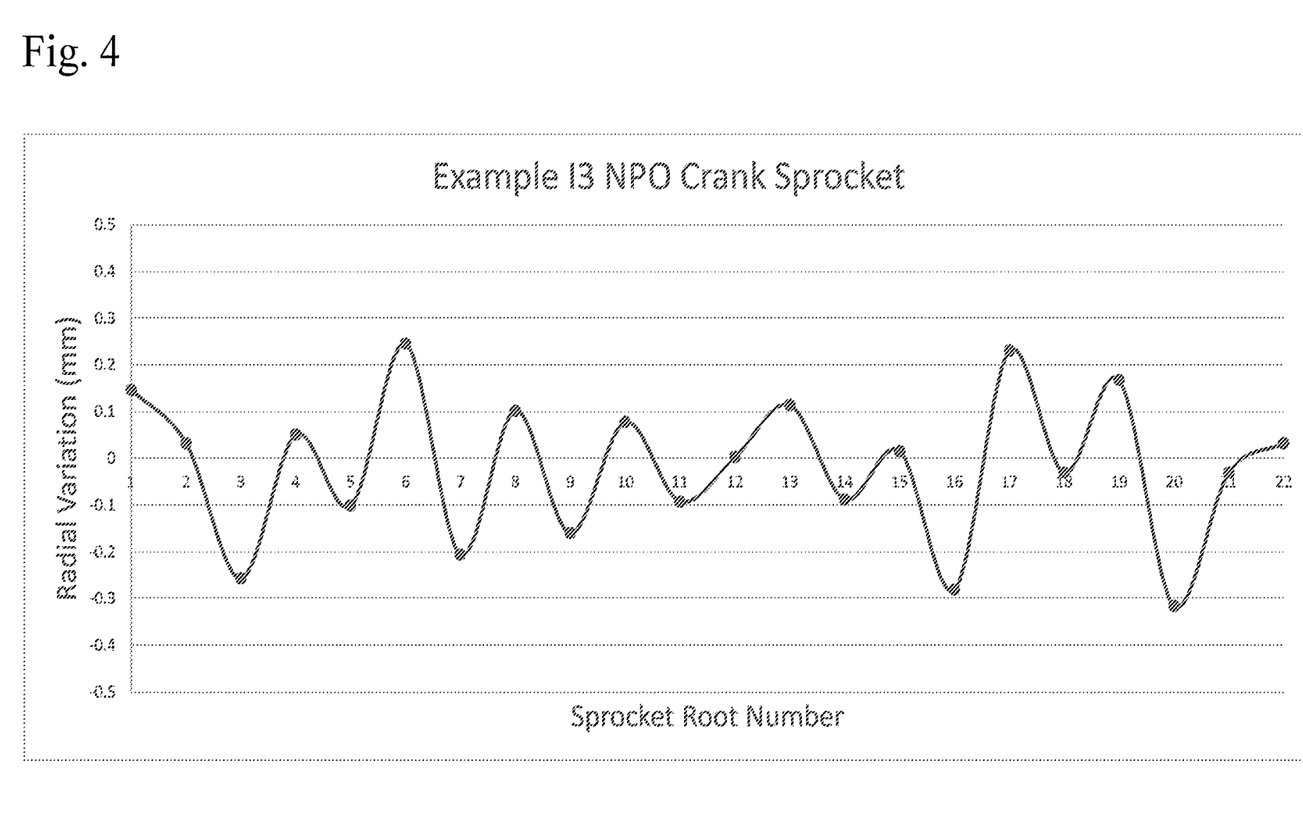
FIG. 4 shows a graph of an example of radial variation versus sprocket root number for a crank sprocket of an inline 3 cylinder engine.
Figure 5:
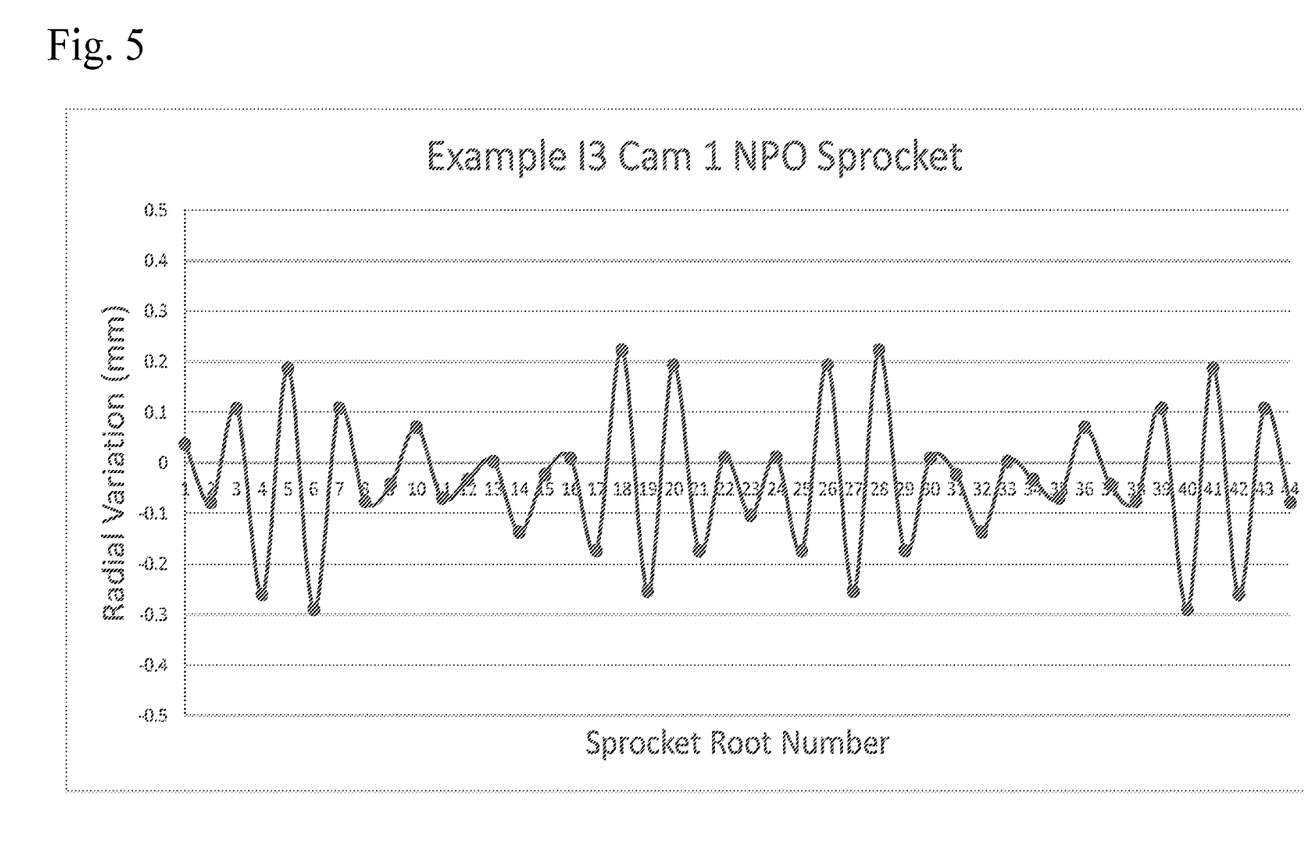
FIG. 5 shows a graph of an example of radial variation versus sprocket root number for a first cam sprocket of an inline 3 cylinder engine.
Figure 6:
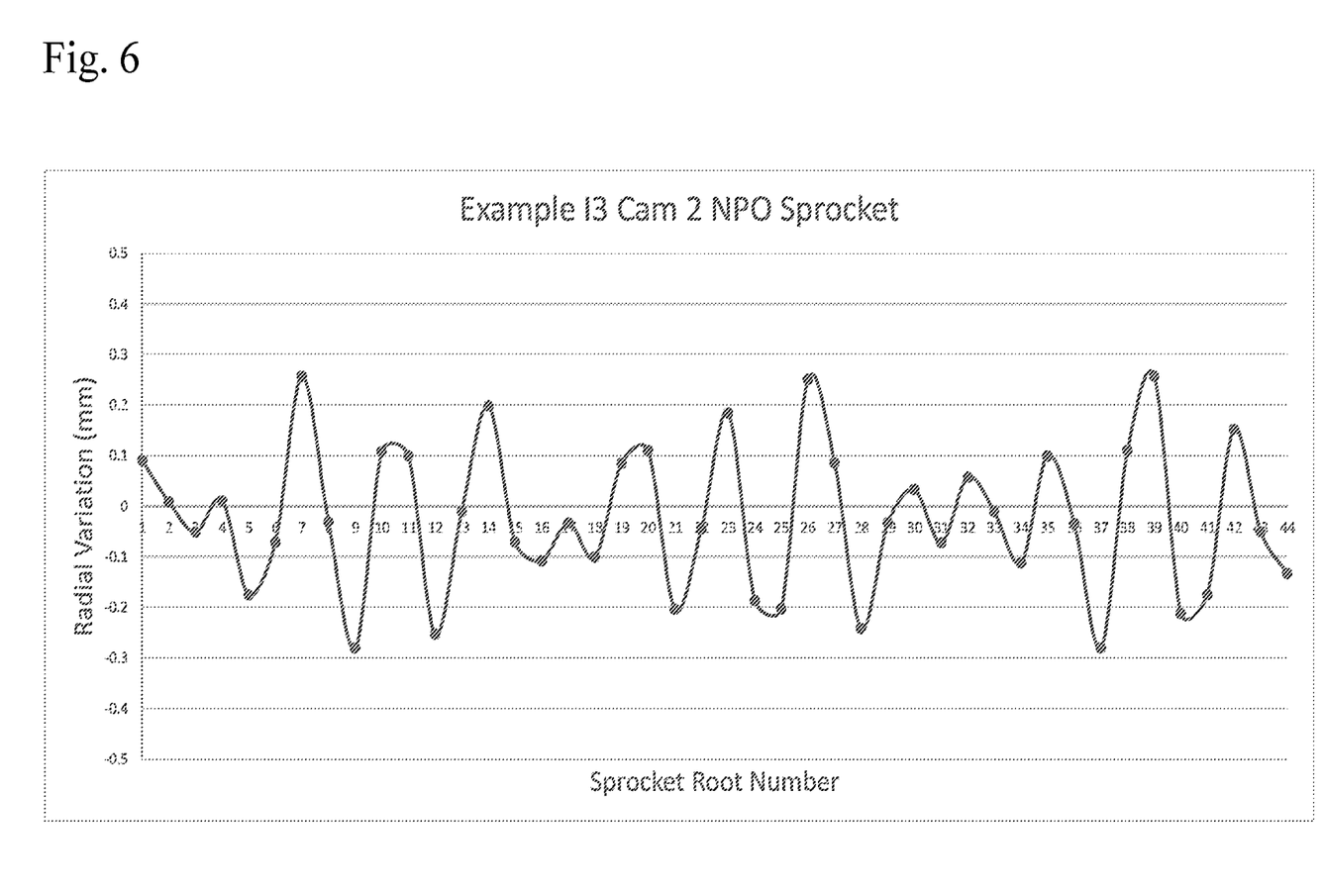
FIG. 6 shows a graph of an example of radial variation versus sprocket root number for a second cam sprocket of an inline 3 cylinder engine.

FIGS. 4-6 show graphs of radial variation versus sprocket root number for the crank sprocket, the first cam sprocket and the second cam sprocket, respectively. Table 4 shows the corresponding radial variation for each sprocket root number of the crank sprocket as shown in FIG. 4.

TABLE 4

I3 NPO Crank Sprocket

| Sprocket Root Number | Radial Variation (mm) |
|---|---|
| 1 | 0.146499 |
| 2 | 0.032088 |
| 3 | -0.257287 |
| 4 | 0.050674 |
| 5 | -0.101813 |
| 6 | 0.24522 |
| 7 | -0.206122 |
| 8 | 0.10177 |
| 9 | -0.160254 |
| 10 | 0.077343 |
| 11 | -0.092773 |
| 12 | 0.002285 |
| 13 | 0.113681 |
| 14 | -0.087972 |
| 15 | 0.015203 |
| 16 | -0.281149 |
| 17 | 0.230261 |
| 18 | -0.031066 |
| 19 | 0.167283 |
| 20 | -0.316088 |
| 21 | -0.030852 |
| 22 | 0.032077 |

In this example, the crank sprocket includes non-prevalent orders of 8, 10, and 20.

Table 5 shows the radial variation for each sprocket root number of the first cam sprocket as shown in FIG. 5.

TABLE 5

I3 NPO First Cam Sprocket

| Sprocket Root Number | Radial Variation (mm) |
|---|---|
| 1 | 0.036746 |
| 2 | -0.078233 |
| 3 | 0.107503 |
| 4 | -0.259889 |
| 5 | 0.187552 |
| 6 | -0.289878 |
| 7 | 0.108044 |
| 8 | -0.076245 |
| 9 | -0.043002 |
| 10 | 0.070639 |
| 11 | -0.06974 |
| 12 | -0.033164 |
| 13 | 0.002874 |
| 14 | -0.137021 |
| 15 | -0.022671 |
| 16 | 0.009453 |
| 17 | -0.173133 |
| 18 | 0.22332 |
| 19 | -0.254149 |
| 20 | 0.193365 |

TABLE 5-continued

I3 NPO First Cam Sprocket

| Sprocket Root Number | Radial Variation (mm) |
|---|---|
| 21 | −0.173631 |
| 22 | 0.011678 |
| 23 | −0.103254 |
| 24 | 0.011678 |
| 25 | −0.173631 |
| 26 | 0.193365 |
| 27 | −0.254149 |
| 28 | 0.22332 |
| 29 | −0.173133 |
| 30 | 0.009453 |
| 31 | −0.022671 |
| 32 | −0.137021 |
| 33 | 0.002874 |
| 34 | −0.033164 |
| 35 | −0.06974 |
| 36 | 0.070639 |
| 37 | −0.043002 |
| 38 | −0.076245 |
| 39 | 0.108044 |
| 40 | −0.289878 |
| 41 | 0.187552 |
| 42 | −0.259889 |
| 43 | 0.107503 |
| 44 | −0.078233 |

In this example, the first cam sprocket includes non-prevalent orders of 5, 17, and 21.

Table 6 shows the radial variation for each sprocket root number of the second cam sprocket as shown in FIG. 6.

TABLE 6

I3 NPO Second Cam Sprocket

| Sprocket Root Number | Radial Variation (mm) |
|---|---|
| 1 | 0.090236 |
| 2 | 0.008586 |
| 3 | −0.051198 |
| 4 | 0.010829 |
| 5 | −0.175437 |
| 6 | −0.071511 |
| 7 | 0.25702 |
| 8 | −0.031618 |
| 9 | −0.280363 |
| 10 | 0.107377 |
| 11 | 0.099264 |
| 12 | −0.253132 |
| 13 | −0.010771 |
| 14 | 0.198213 |
| 15 | −0.071345 |
| 16 | −0.108369 |
| 17 | −0.033148 |
| 18 | −0.100797 |
| 19 | 0.084672 |

TABLE 6-continued

I3 NPO Second Cam Sprocket

| Sprocket Root Number | Radial Variation (mm) |
|---|---|
| 20 | 0.10992 |
| 21 | −0.203694 |
| 22 | −0.45007 |
| 23 | 0.184407 |
| 24 | −0.186267 |
| 25 | −0.202825 |
| 26 | 0.250946 |
| 27 | 0.085708 |
| 28 | −0.241838 |
| 29 | −0.033189 |
| 30 | 0.032864 |
| 31 | −0.072002 |
| 32 | 0.057048 |
| 33 | −0.011153 |
| 34 | −0.112084 |
| 35 | 0.098864 |
| 36 | −0.0338 |
| 37 | −0.280256 |
| 38 | 0.109592 |
| 39 | 0.257296 |
| 40 | −0.212533 |
| 41 | −0.175173 |
| 42 | 0.151855 |
| 43 | −0.050663 |
| 44 | −0.132649 |

In this example, the second cam sprocket includes non-prevalent orders of 7, 11 and 14.

Table 7 shows results from using the three sprockets (crank sprocket, cam sprocket 1, cam sprocket 2) discussed above versus using a single NPO sprocket as the crank sprocket and "straight" or round sprockets as the two cam sprockets.

TABLE 7

Unique Order NPO Results

| Engine Cycle Orders Used for NPO Sprocket Design | | | Pitch | Maximum |
|---|---|---|---|---|
| Crank Sprocket | Cam 1 Sprocket | Cam 2 Sprocket | Order Reduction (%) | Tension Change (%) |
| $8^{th}$, $10^{th}$, $20^{th}$ | None (round sprocket) | None (round sprocket) | 22.45 | 1.07 |
| 8, $10^{th}$, $20^{th}$ | $5^{th}$, $17^{th}$, $21^{st}$ | $7^{th}$, $11^{th}$, $14^{th}$ | 38.45 | −2.33 |

As shown, multiple NPO random sprockets with unique orders results in the lowest pitch frequency while minimizing unwanted side effects. Maximum chain tension is changed by less than 5%.

Table 8 shows results from using unique order NPO sprockets for the cam 2 sprocket at all possible orientations.

TABLE 8

Unique Order NPO Result-Cam Sprocket 2

| Cam Sprocket 2 Orientation | Maximum Tension Change (%) | Cam Sprocket 2 Orientation | Maximum Tension Change (%) | Cam Sprocket 2 Orientation | Maximum Tension Change (%) | Cam Sprocket 2 Orientation | Maximum Tension Change (%) |
|---|---|---|---|---|---|---|---|
| Retard tooth 1 | −1.14 | Retard tooth 12 | −1.70 | Regard tooth 23 | −0.38 | Retard tooth 34 | −1.83 |
| Retard tooth 2 | −1.20 | Retard tooth 13 | −1.07 | Retard tooth 24 | −0.38 | Retard tooth 35 | −0.95 |
| Retard tooth 3 | −1.64 | Retard tooth 14 | −1.39 | Retard tooth 25 | −2.84 | Retard tooth 36 | 0.00 |

TABLE 8-continued

Unique Order NPO Result-Cam Sprocket 2

| Cam Sprocket 2 Orientation | Maximum Tension Change (%) | Cam Sprocket 2 Orientation | Maximum Tension Change (%) | Cam Sprocket 2 Orientation | Maximum Tension Change (%) | Cam Sprocket 2 Orientation | Maximum Tension Change (%) |
|---|---|---|---|---|---|---|---|
| Retard tooth 4  | −0.06 | Retard tooth 15 | −0.88 | Retard tooth 26 | −1.96 | Retard tooth 37 | −2.46 |
| Retard tooth 5  | −1.26 | Retard tooth 16 | −0.95 | Retard tooth 27 | −0.50 | Retard tooth 38 | −2.71 |
| Retard tooth 6  | −3.28 | Retard tooth 17 | −0.50 | Retard tooth 28 | −1.32 | Retard tooth 39 | −0.95 |
| Retard tooth 7  | −1.32 | Retard tooth 18 | −2.21 | Retard tooth 29 | −0.95 | Retard tooth 40 | −0.57 |
| Retard tooth 8  | −0.32 | Retard tooth 19 | −2.27 | Retard tooth 30 | −1.39 | Retard tooth 41 | −1.89 |
| Retard tooth 9  | −1.83 | Retard tooth 20 | −0.38 | Retard tooth 31 | −2.15 | Retard tooth 42 | −1.26 |
| Retard tooth 10 | −1.64 | Retard tooth 21 | −1.01 | Retard tooth 32 | −1.14 | Retard tooth 43 | −1.07 |
| Retard tooth 11 | −0.38 | Retard tooth 22 | −1.77 | Retard tooth 33 | −0.63 | Retard tooth 44 | −2.33 |

In all cases, maximum chain tension is changed by less than 5%, confirming the benefit of using unique order NPO random sprockets. The relative orientation of the unique order NPO random sprocket, for example as cam sprocket 2 does not affect maximum chain tensions the same way as a traditional random sprocket, such as in U.S. Pat. No. 6,213,905.

Table 9 shows examples of possible NPO sprocket unique engine cycle order combinations for use with an inline 3-cylinder (I3) engine. It is noted that the table does not include a complete exhaustive list, but multiple examples of unique engine cycle order combinations which may be most used to reduce pitch noise without increasing tension. It is noted that while multiple engine cycle orders are listed for each sprocket, one or more engine cycle orders can be incorporated into the radial variation pattern of the sprocket, with the number of engine cycle orders incorporated into the radial variation pattern of the sprocket being limited by the number of teeth of the each of the sprockets.

TABLE 9

Examples of Possible Unique Order NPO Combinations for DOHC I3 Engine Cycle Orders Used for NPO Sprocket Design

| Crank Sprocket | Cam 1 sprocket | Cam 2 sprocket |
|---|---|---|
| 8, 10, 20 | 5, 17, 21 | 7, 11, 14 |
| 8, 10, 20 | 7, 11, 14 | 5, 17, 21 |
| 8, 10, 20 | 4, 7, 13 | 5, 11, 21 |
| 8, 10, 20 | 4, 7, 13 | 11, 17, 21 |
| 8, 10, 20 | 4, 7, 13 | 5, 14, 17 |
| 8, 10, 20 | 5, 11, 21 | 4, 7, 13 |
| 8, 10, 20 | 11, 17, 21 | 4, 7, 13 |
| 8, 10, 20 | 5, 14, 17 | 4, 7, 13 |
| 8, 10, 20 | 4, 7, 13, 16 | 5, 11, 14, 17 |
| 8, 10, 20 | 5, 11, 14, 17 | 4, 7, 13, 16 |
| 8, 10, 20 | 4, 7, 13, 16, 19 | 5, 11, 14, 17, 21 |
| 8, 10, 20 | 4, 5, 7, 11, 13 | 14, 16, 17, 19, 21 |
| 8, 10, 20 | 4, 5, 17, 19, 21 | 7, 11, 13, 14, 16 |
| 8, 10, 20 | 4, 13, 17, 19, 21 | 5, 7, 11, 4, 16 |
| 8, 10, 20 | 5, 11, 14, 17, 21 | 4, 7, 13, 16, 19 |
| 8, 10, 20 | 14, 16, 17, 19, 21 | 4, 5, 7, 11, 13 |
| 8, 10, 20 | 7, 11, 13, 14, 16 | 4, 5, 17, 19, 21 |
| 8, 10, 20 | 5, 7, 11, 4, 16 | 4, 13, 17, 19, 21 |
| 8, 10, 20 | 4, 7, 13 | 5, 11, 14, 16, 17, 19, 21 |
| 8, 10, 20 | 5, 11, 14 | 4, 7, 13, 16, 17, 19, 21 |
| 8, 10, 20 | 5, 11, 14, 16, 17, 19, 21 | 4, 7, 13 |
| 8, 10, 20 | 4, 7, 13, 16, 17, 19, 21 | 5, 11, 14 |

TABLE 9-continued

Examples of Possible Unique Order NPO Combinations for DOHC I3 Engine Cycle Orders Used for NPO Sprocket Design

| Crank Sprocket | Cam 1 sprocket | Cam 2 sprocket |
|---|---|---|
| 4, 8, 10, 14, 16 | 5, 7, 11, 13 | 17, 19, 21 |
| 4, 8, 10, 14, 16 | 5, 7, 17, 21 | 7, 13, 19 |
| 4, 8, 10, 14, 16 | 7, 13, 21 | 5, 11, 17, 19 |
| 4, 8, 10, 14, 16 | 17, 19, 21 | 5, 7, 11, 13 |
| 4, 8, 10, 14, 16 | 7, 13, 19 | 5, 11, 17, 21 |
| 4, 8, 10, 14, 16 | 5, 11, 17, 19 | 7, 13, 21 |
| 8, 10 | 5, 17, 21 | 7, 11, 14 |
| 8, 10 | 5, 17 | 7, 11 |
| 8, 10 | 5, 11, 17, 19 | 4, 13, 14, 16 |
| 8, 10 | 4, 11, 16, 19 | 5, 13, 16, 17 |
| 8, 10 | 7, 11, 14 | 5, 17, 21 |
| 8, 10 | 7, 11 | 5, 17 |
| 8, 10 | 4, 13, 14, 16 | 5, 11, 17, 19 |
| 8, 10 | 5, 13, 16, 17 | 4, 11, 16, 19 |

Table 10 shows examples of possible NPO sprocket unique engine cycle order combinations for use with a typical DOHC inline 4 cylinder (I4) engine. It is noted that the table does not include a complete exhaustive list, but multiple examples of unique engine cycle order combinations which may be most used to reduce pitch noise without increasing tension. It is noted that when multiple engine cycle orders are listed for each sprocket, one or more engine cycle orders can be incorporated into the radial variation pattern of the sprocket, with the number of engine cycle orders incorporated into the radial variation pattern of the sprocket being limited by the number of teeth of the each of the sprockets.

TABLE 10

Examples of Possible Unique Order NPO Combinations for DOHC I4 Engine Cycle Orders Used for NPO Sprocket Design (combinations of engine cycle orders 6, 9, 10, 11, 13, 14, 15, 17)

| Crank Sprocket | Cam 1 sprocket | Cam 2 sprocket |
|---|---|---|
| 6, 10, 14 | 9, 13, 15 | 11, 17 |
| 6, 10, 14 | 9, 11, 15 | 13, 17 |
| 6, 10, 14 | 9, 13, 17 | 11, 15 |
| 6, 10, 14 | 9, 11, 17 | 13, 15 |
| 6, 10, 14 | 9, 15, 17 | 11, 13 |

TABLE 10-continued

Examples of Possible Unique Order NPO Combinations for DOHC I4 Engine Cycle Orders Used for NPO Sprocket Design (combinations of engine cycle orders 6, 9, 10, 11, 13, 14, 15, 17)

| Crank Sprocket | Cam 1 sprocket | Cam 2 sprocket |
| --- | --- | --- |
| 6, 10, 14 | 11, 17 | 9, 13, 15 |
| 6, 10, 14 | 13, 17 | 9, 11, 15 |
| 6, 10, 14 | 11, 15 | 9, 13, 17 |
| 6, 10, 14 | 13, 15 | 9, 11, 17 |
| 6, 10, 14 | 11, 13 | 9, 15, 17 |
| 6, 14 | 9, 13, 15 | 10, 11, 17 |
| 6, 14 | 9, 10, 11, 15 | 13, 17 |
| 6, 14 | 9, 13, 17 | 10, 11, 15 |
| 6, 14 | 9, 10, 11, 17 | 13, 15 |
| 6, 14 | 9, 15, 17 | 10, 11, 13 |
| 6, 14 | 9, 10, 13, 15 | 11, 17 |
| 6, 14 | 9, 11, 15 | 10, 13, 17 |
| 6, 14 | 9, 10, 13, 17 | 11, 15 |
| 6, 14 | 9, 11, 17 | 10, 13, 15 |
| 6, 14 | 9, 10, 15, 17 | 11, 13 |
| 6, 14 | 10, 11, 17 | 9, 13, 15 |
| 6, 14 | 13, 17 | 9, 10, 11, 15 |
| 6, 14 | 10, 11, 15 | 9, 13, 17 |
| 6, 14 | 13, 15 | 9, 10, 11, 17 |
| 6, 14 | 10, 11, 13 | 9, 15, 17 |
| 6, 14 | 11, 17 | 9, 10, 13, 15 |
| 6, 14 | 10, 13, 17 | 9, 11, 15 |
| 6, 14 | 11, 15 | 9, 10, 13, 17 |
| 6, 14 | 10, 13, 15 | 9, 11, 17 |
| 6, 14 | 11, 13 | 9, 10, 15, 17 |
| 6, 14 | 10, 13 | 9, 15 |
| 6, 14 | 11, 17 | 9, 10 |
| 6, 14 | 10, 13 | 9, 15 |
| 6, 14 | 11, 15 | 10, 17 |
| 6, 14 | 10, 13 | 11, 17 |
| 6, 14 | 11, 13 | 15, 17 |
| 6, 14 | 9, 15 | 10, 13 |
| 6, 14 | 9, 10 | 11, 17 |
| 6, 14 | 9, 15 | 10, 13 |
| 6, 14 | 10, 17 | 11, 15 |
| 6, 14 | 11, 17 | 10, 13 |
| 6, 14 | 15, 17 | 11, 13 |
| 6, 14 | 15 | 11, 13 |
| 6, 14 | 15, 17 | 13 |
| — | 15, 17 | 6, 13, 14 |
| — | 6, 15, 17 | 13, 14 |
| 6, 10, 14 | — | 9, 11, 13, 15 |
| 6, 10, 14 | 9, 11, 15, 17 | — |

It is noted that for the sprockets in the above table in which no prevalent orders are listed, the sprocket can be a standard round sprocket or a non-circular tension reducing sprocket.

Table 11 shows examples of possible NPO sprocket unique engine cycle order combinations for use with a typical single overhead cam (SOHC) inline 4 cylinder (I4) engine. It is noted that the table does not include a complete exhaustive list, but multiple examples of unique engine cycle order combinations which may be most used to reduce pitch noise without increasing tension. It is noted that while multiple engine cycle orders are listed for each sprocket, one or more engine cycle orders can be incorporated into the radial variation pattern of the sprocket, with the number of engine cycle orders incorporated into the radial variation pattern of the sprocket being limited by the number of teeth of the each of the sprockets.

TABLE 11

Examples of Possible Unique Order NPO Combinations for SOHC I4 Engine Cycle Orders Used for NPO Sprocket Design (combinations of engine cycle orders 6, 9, 10, 11, 13, 14, 15, 17)

| Crank Sprocket | Cam 1 sprocket |
| --- | --- |
| 6, 10, 14 | 9, 11, 13, 15, 17 |
| 6, 10, 14 | 9, 11, 13, 15 |
| 6, 10, 14 | 9, 11, 13, 17 |
| 6, 10, 14 | 9, 11, 15, 17 |
| 6, 10, 14 | 9, 13, 15, 17 |
| 6, 10, 14 | 11, 13, 15, 17 |
| 6, 10, 14 | 9, 11, 13 |
| 6, 10, 14 | 9, 11, 15 |
| 6, 10, 14 | 9, 13, 15 |
| 6, 10, 14 | 11, 13, 15 |
| 6, 10, 14 | 9, 11, 13 |
| 6, 10, 14 | 9, 11, 17 |
| 6, 10, 14 | 9, 13, 17 |
| 6, 10, 14 | 11, 13, 17 |
| 6, 10, 14 | 9, 11, 15 |
| 6, 10, 14 | 9, 11, 17 |
| 6, 10, 14 | 9, 15, 17 |
| 6, 10, 14 | 11, 15, 17 |
| 6, 10, 14 | 9, 13, 15 |
| 6, 10, 14 | 9, 13, 17 |
| 6, 10, 14 | 9, 11 |
| 6, 10, 14 | 9, 13 |
| 6, 10, 14 | 11, 13 |
| 6, 10, 14 | 11, 17 |
| 6, 10, 14 | 13, 17 |
| 10, 14 | 6, 11, 13, 15 |
| 10, 14 | 9, 11, 13 |
| 10, 14 | 6, 9, 11, 17 |
| 10, 14 | 9, 13, 17 |
| 10, 14 | 6, 11, 13, 17 |
| 10, 14 | 9, 11, 15 |
| 10, 14 | 6, 9, 11, 17 |
| 10, 14 | 9, 15, 17 |
| 10, 14 | 6, 11, 15, 17 |
| 10, 14 | 9, 13, 15 |
| 10, 14 | 6, 9, 13 |
| 10, 14 | 6, 11, 13 |
| 10, 14 | 6, 9, 11, 13, 15, 17 |
| 10 | 6, 11, 13 |

Figure 3:
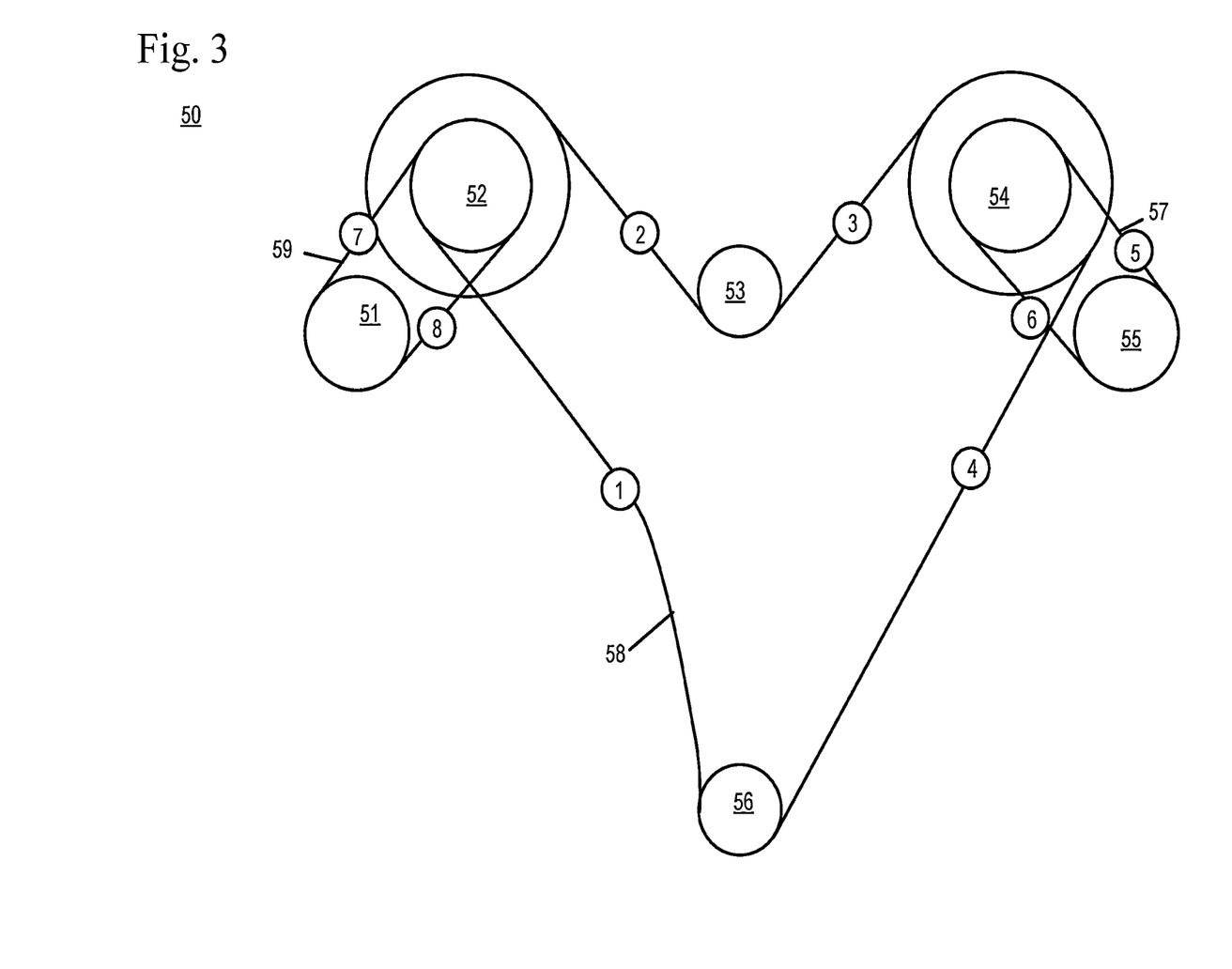
FIG. 3 shows a typical serpentine (dual bank) engine layout.

Table 12 shows examples of possible NPO sprocket unique engine cycle order combinations for use with a typical DOHC V6 serpentine drive engine as shown in FIG. 3. In the DOHC V6 serpentine drive engine 50, a crank sprocket 56 drives four different camshaft sprockets 52, 51, 54, 55 and an idler sprocket 53 via chain 58. A first chain strand of chain 58 is present between the crank sprocket 56 and cam sprocket 52. A second chain strand of chain 58 is present between cam sprocket 52 and idler sprocket 53. A third chain strand of chain 58 is present between idler sprocket 53 and cam sprocket 54. A fourth chain strand of chain 58 is present between cam sprocket 54 and crank sprocket 56. Cam sprocket 52 is also connected to cam sprocket 51 via chain 59. Cam sprocket 54 is connected to cam sprocket 55 via chain 57. Chains 57 and 59 each have two chain strands indicated by reference numbers 7 and 8 for chain 59 and reference numbers 5 and 6 for chain 57.

TABLE 12

Examples of Possible Unique Order NPO Combinations for DOHC V6 Serpentine Drive Engine Cycle Orders Used for NPO Sprocket Design
(combinations of engine cycle orders 3, 8, 9, 10, 11, 13, 14, 15, 16, 17)

| Crank Sprocket | Cam 1 Sprocket | Cam 2 Sprocket | Idler Sprocket | Cam 3 Sprocket | Cam 4 Sprocket |
|---|---|---|---|---|---|
| 14, 16 | 3, 11 | 8, 13 | 17 | 9 | 10, 15 |
| 14, 16 | 10, 15 | 3, 11 | 8, 13 | 17 | 9 |
| 14, 16 | 9 | 10, 15 | 3, 11 | 8, 13 | 17 |
| 14, 16 | 17 | 9 | 10, 15 | 3, 11 | 8, 13 |
| 14, 16 | 8, 13 | 17 | 9 | 10, 15 | 3, 11 |
| 14, 16 | 3, 11 | 17 | 8, 13 | 9 | 10, 15 |
| 14, 16 | 3, 11 | — | 8, 13 | 9, 17 | 10, 15 |
| 14, 16 | 3, 11 | 9, 17 | 8, 13 | — | 10, 15 |
| 14, 16 | 3, 9, 11 | — | 8, 13 | — | 10, 15, 17 |
| 8, 14 | 3, 11 | 13, 16 | 17 | 9 | 10, 15 |
| 8, 14 | 10, 15 | 3, 11 | 13, 16 | 17 | 9 |
| 8, 14 | 9 | 10, 15 | 3, 11 | 13, 16 | 17 |
| 8, 14 | 17 | 9 | 10, 15 | 3, 11 | 13, 16 |
| 8, 14 | 13, 16 | 17 | 9 | 10, 15 | 3, 11 |
| 8, 14 | 3, 11 | 17 | 13, 16 | 9 | 10, 15 |
| 8, 14 | 3, 11 | — | 13, 16 | 9, 17 | 10, 15 |
| 8, 14 | 3, 11 | 9, 17 | 13, 16 | — | 10, 15 |
| 8, 14 | 3, 9, 11 | — | 13, 16 | — | 10, 15, 17 |
| 8, 16 | 3, 11 | 13, 14 | 17 | 9 | 10, 15 |
| 8, 16 | 10, 15 | 3, 11 | 13, 14 | 17 | 9 |
| 8, 16 | 9 | 10, 15 | 3, 11 | 13, 14 | 17 |
| 8, 16 | 17 | 9 | 10, 15 | 3, 11 | 13, 14 |
| 8, 16 | 13, 14 | 17 | 9 | 10, 15 | 3, 11 |
| 8, 16 | 3, 11 | 17 | 13, 14 | 9 | 10, 15 |
| 8, 16 | 3, 11 | — | 13, 14 | 9, 17 | 10, 15 |
| 8, 16 | 3, 11 | 9, 17 | 13, 14 | — | 10, 15 |
| 8, 16 | 3, 9, 11 | — | 13, 14 | — | 10, 15, 17 |
| 10, 14, 16 | 3, 11 | 13 | 17 | 9 | 10, 15 |
| 10, 14, 16 | 10, 15 | 3, 11 | 13 | 17 | 9 |
| 10, 14, 16 | 9 | 10, 15 | 3, 11 | 13 | 17 |
| 10, 14, 16 | 17 | 9 | 10, 15 | 3, 11 | 13 |
| 10, 14, 16 | 13 | 17 | 9 | 10, 15 | 3, 11 |
| 10, 14, 16 | 3, 11 | 17 | 13 | 9 | 10, 15 |
| 10, 14, 16 | 3, 11 | — | 13 | 9, 17 | 10, 15 |
| 10, 14, 16 | 3, 11 | 9, 17 | 13 | — | 10, 15 |
| 10, 14, 16 | 3, 9, 11 | — | 13 | — | 10, 15, 17 |

It is noted that for the sprockets in the above table in which no prevalent orders are listed, the sprocket can be a standard round sprocket or a non-circular tension reducing sprocket.

It is noted that the table does not include a complete exhaustive list, but multiple examples of unique engine cycle order combinations which may be most used to reduce pitch noise without increasing tension. It is noted that while multiple engine cycle orders are listed for each sprocket, one or more engine cycle orders can be incorporated into the radial variation pattern of the sprocket, with the number of engine cycle orders incorporated into the radial variation pattern of the sprocket being limited by the number of teeth of the each of the sprockets.

Figure 2:
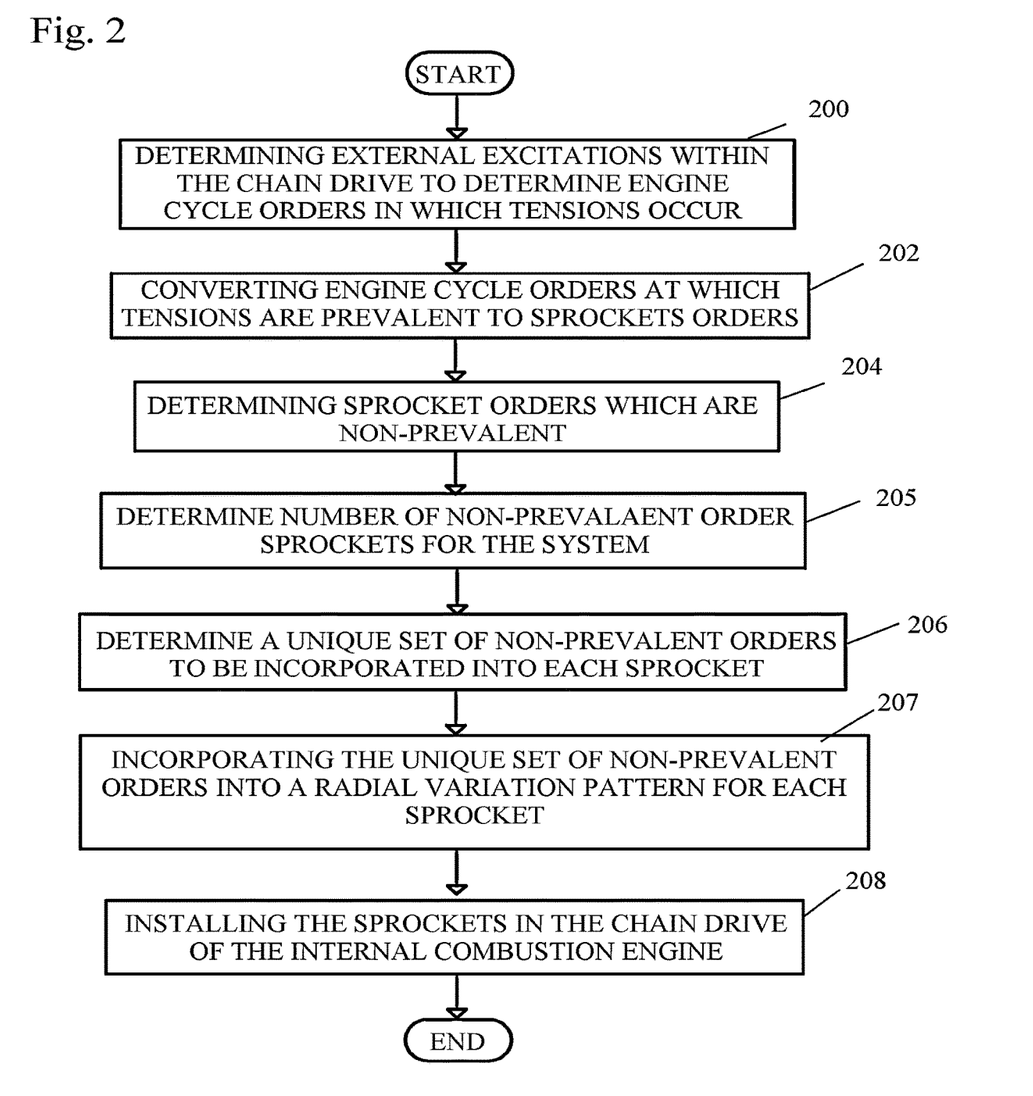
FIG. 2 is a flowchart of a method of reducing engagement noise without increasing maximum chain tensions using NPO random sprockets.

FIG. 2 is a flowchart of a method of reducing engagement noise without increasing maximum chain tensions using NPO random sprockets.

In a first step, external excitations within the chain drive are determined to determine engine cycle orders in which tensions occur (step 200). Alternatively, excitations can be applied to the chain drive in order to determine the tensions and then determine the prevalent engine cycle order(s).

Engine cycle orders at which tensions are prevalent within the chain drive are converted into sprocket orders (step 202). For example, crank sprocket orders are half as much as engine cycle orders. So, a fourth engine cycle order is a second crank sprocket order.

The orders which are non-prevalent are determined (step 204). These are the orders which were not discovered in steps 200-202.

The number of NPO sprockets for the system is determined (step 205). It is noted that preferably at least two sprockets per system are designated as NPO sprockets. In another embodiment, at least one crank sprocket and two cam sprockets are designated as NPO sprockets. In one embodiment, the two sprockets designated as NPO sprockets are the driving or crank sprocket and driven cam sprocket 1. In another embodiment, the two sprockets designated as NPO sprockets are the driving or crank sprocket and the driven cam sprocket 2. In yet another embodiment, the driven cam sprocket 1 and the driven cam sprocket 2 are NPO sprockets. In other cases, an idler sprocket is also an NPO sprocket.

Next a unique set of non-prevalent orders to be incorporated into each sprocket of step 205 is determined (step 206). In one embodiment, each sprocket has at least one order. In another embodiment, each sprocket has up to 3 non-prevalent orders. In another embodiment, each sprocket has up to 4 non-prevalent orders. In another embodiment, each sprocket has up to 5 non-prevalent orders. It is noted that the total number of non-prevalent orders incorporated into each sprocket is dependent on the number of teeth. The larger the number of sprocket teeth, the greater the number of non-prevalent orders that can be incorporated. It is also noted that while each sprocket can have up to 5 non-prevalent orders, each sprocket in the engine may have a different number of orders.

To establish unique orders between the sprockets, orders need to be compared based on the same reference cycle. The reference cycle is an engine cycle. Sprocket orders can be different from engine cycle orders. For example, a variation that occurs once per crank sprocket revolution can be referred to as first crank order. It can also be referred to as second engine cycle order because the crank sprocket rotates twice in an engine cycle (assuming a four-stroke engine). A variation that occurs once per cam sprocket revolution can be referred to as one cam sprocket cycle or one engine cycle because the cam sprocket rotates once per engine cycle.

For example, a crank NPO random sprocket could use 3rd and 4th crank sprocket orders. A cam NPO random sprocket could use 3rd and 4th cam sprocket orders. These sprockets use unique engine cycle orders because the crank NPO random sprocket uses 6th and 8th engine cycle orders while the cam NPO random sprocket uses 3rd and 4th engine cycle orders. It is noted that converting from sprocket orders to engine cycle orders could result in non-integer engine cycle orders (depending on the speed of the sprocket relative to the crank shaft). Non-integer engine cycle orders, for example, can occur on multi-stage drives with an intermediate shaft that does not rotate at crank speed or cam speed.

The at least one non-prevalent orders are incorporated into the radial variation pattern of each sprocket (step 207) to create unique non-prevalent order (NPO) sprockets. The amplitude of the non-prevalent orders determines the tensions that will be introduced into the chain drive and corresponds to the radial variation pattern of the sprocket.

In a preferred embodiment, non-prevalent orders chosen are less than half of the number of teeth of the sprocket and first and second orders are typically avoided, since orders above half the number of sprocket teeth are aliased and appear as lower orders. Low orders, like the first and the second orders, typically have little impact on engagement noise because they do not cause enough change in engagement timing and is why there is not much reduction in engagement noise with tension reducing sprockets.

The non-prevalent order (NPO) sprockets are installed in the chain drive of the internal combustion engine (step 208) and the method ends.

It should be noted that that while the chain drive system described above refer to camshafts, fuel pumps, etc., the NPO sprocket of the invention is equally useful with other engine accessories and components driven by a chain, such as balance shafts or water pumps, etc.

It should also be noted that while the description above is in the context of internal combustion engines, the NPO sprocket of the invention can also be used with other chain applications such as transmissions, transfer cases, hybrid drives, and so on. It will be understood that the NPO concept can be applied to any chain-driven system that has excitations at specific orders or interactions with other systems at specific orders (creating orders than need to be avoided in the random pattern).

It should also be noted that the term "sprocket" includes the pulleys used in toothed belt driven systems.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of reducing engagement noise in a chain drive or belt drive for an internal combustion engine having a crankshaft having a driving sprocket and at least one driven shaft having at least a first driven sprocket, comprising the steps of:
    determining external excitations within the chain drive to determine engine cycle orders at which tensions occur;
    converting engine cycle orders at which tensions are prevalent to sprocket orders;
    determining sprocket orders which are non-prevalent;
    determining a number of non-prevalent order sprockets for the chain drive or belt drive;
    determining a unique set of non-prevalent orders to be incorporated into each of the number of non-prevalent order sprockets determined for the chain drive or belt drive, such that no non-prevalent order sprocket has the same engine cycle orders;
    incorporating a unique set of at least one non-prevalent order into a radial variation pattern of a sprocket for each of the non-prevalent order sprockets; and
    installing the non-prevalent order sprockets in the chain drive or belt drive of the internal combustion engine.

2. The method of claim 1, wherein the unique set of each at least one non-prevalent orders includes three non-prevalent orders for each non-prevalent order sprockets.

3. The method of claim 1, wherein the unique set of each at least one non-prevalent orders includes two non-prevalent orders for each non-prevalent order sprockets.

4. The method of claim 1, further comprising a second driven sprocket, wherein at least the driving sprocket and at least one of the first driven sprocket or the second driven sprocket include non-prevalent orders.

5. The method of claim 1, wherein at least the driving sprocket and at least the first driven sprocket are non-prevalent order sprockets, and the non-prevalent orders of the driving sprocket are different than the non-prevalent orders of the at least first driven sprocket.

6. The method of claim 1, wherein the driving sprocket, the first driven sprocket and the second driven sprocket are non-prevalent order sprockets, such that non-prevalent engine cycle orders of the driving sprocket are different than non-prevalent engine cycle orders of the first driven sprocket and non-prevalent engine cycle orders of the second driven sprocket and the non-prevalent engine cycle orders of the first driven sprocket are different than the non-prevalent engine cycle orders of the second driven sprocket.

7. A chain drive or belt drive for an internal combustion engine having a crankshaft having a driving sprocket and at least a first driven sprocket, the chain drive or belt drive comprising:
    the driving sprocket and the at least one driven sprocket being a non-prevalent order random sprocket each comprising: a pattern of pitch radii, such that the radial variation of the pitch radii excite tensions at non-prevalent orders in a drive system of the internal combustion engine; wherein non-prevalent engine cycle orders in the driving sprocket are different than the non-prevalent engine cycle orders in the at least first driven sprocket; and
    a chain engaging the driving sprocket and the at least first driven sprocket.

8. The chain drive or belt drive of claim 7, further comprising a second driven sprocket, a third driven sprocket, a fourth driven sprocket and a fifth driven sprocket, wherein the second driven sprocket, the third driven sprocket, the fourth driven sprocket and the fifth driven sprocket are non-prevalent order random sprockets and non-prevalent engine cycle orders incorporated into each of the first driven sprocket, the second driven sprocket, the third driven sprocket, the fourth driven sprocket and the fifth driven sprocket are different.

9. The chain drive or belt drive of claim 8, wherein one of the first driven sprocket, the second driven sprocket, the third driven sprocket, the fourth driven sprocket or the fifth driven sprocket is an idler sprocket.

10. The chain drive or belt drive of claim 8, wherein the first driven sprocket and the second driven sprocket are driven by a first camshaft and the third driven sprocket and the fourth driven sprocket are driven by a second camshaft.

11. The chain drive or belt drive of claim 10, wherein the first driven sprocket or the second driven sprocket is on a camshaft of the internal combustion engine.

12. The chain drive or belt drive of claim 7, further comprising a second driven sprocket.

13. The chain drive or belt drive of claim 12, wherein the second driven sprocket is non-prevalent order random sprocket.

14. The chain drive or belt drive of claim 12, wherein the first driven sprocket or the second driven sprocket is on a balance shaft of the internal combustion engine.

15. A chain drive or belt drive for an internal combustion engine having a crankshaft having a driving sprocket and at least one camshaft driving at least one driven sprocket, the chain drive or belt drive comprising at least two sprockets chosen from the driving sprocket and the at least one driven sprocket being a non-prevalent order random sprockets, each comprising: a pattern of pitch radii, such that the radial variation of the pitch radii excite tensions at non-prevalent orders in a drive system of the internal combustion engine; wherein non-prevalent engine cycle orders in the driving sprocket are different than the non-prevalent engine cycle orders in the at least first driven sprocket; and a chain engaging the driving sprocket and the at least first driven sprocket.

16. The chain drive or belt drive of claim 15, further comprising a second driven sprocket, a third driven sprocket, a fourth driven sprocket and a fifth driven sprocket, wherein the second driven sprocket, the third driven sprocket, the fourth driven sprocket and the fifth driven sprocket are non-prevalent order random sprockets, and non-prevalent engine cycle orders incorporated into each of the first driven sprocket, the second driven sprocket, the third driven sprocket, the fourth driven sprocket and the fifth driven sprocket are different.

17. The chain drive or belt drive of claim 16, wherein one of the first driven sprocket, the second driven sprocket, the third driven sprocket, the fourth driven sprocket or the fifth driven sprocket is an idler sprocket.

18. The chain drive or belt drive of claim 16, wherein the first driven sprocket and the second driven sprocket are driven by a first camshaft and the third driven sprocket and the fourth driven sprocket are driven by a second camshaft.

19. The chain drive or belt drive of claim 15, further comprising a second driven sprocket.

20. The chain drive or belt drive of claim 19, wherein the second driven sprocket is non-prevalent order random sprocket.

\* \* \* \* \*